J. L. WOODBRIDGE.
SYSTEM OF ELECTRICAL DISTRIBUTION.
APPLICATION FILED APR. 20, 1909.
1,105,232.
Patented July 28, 1914.
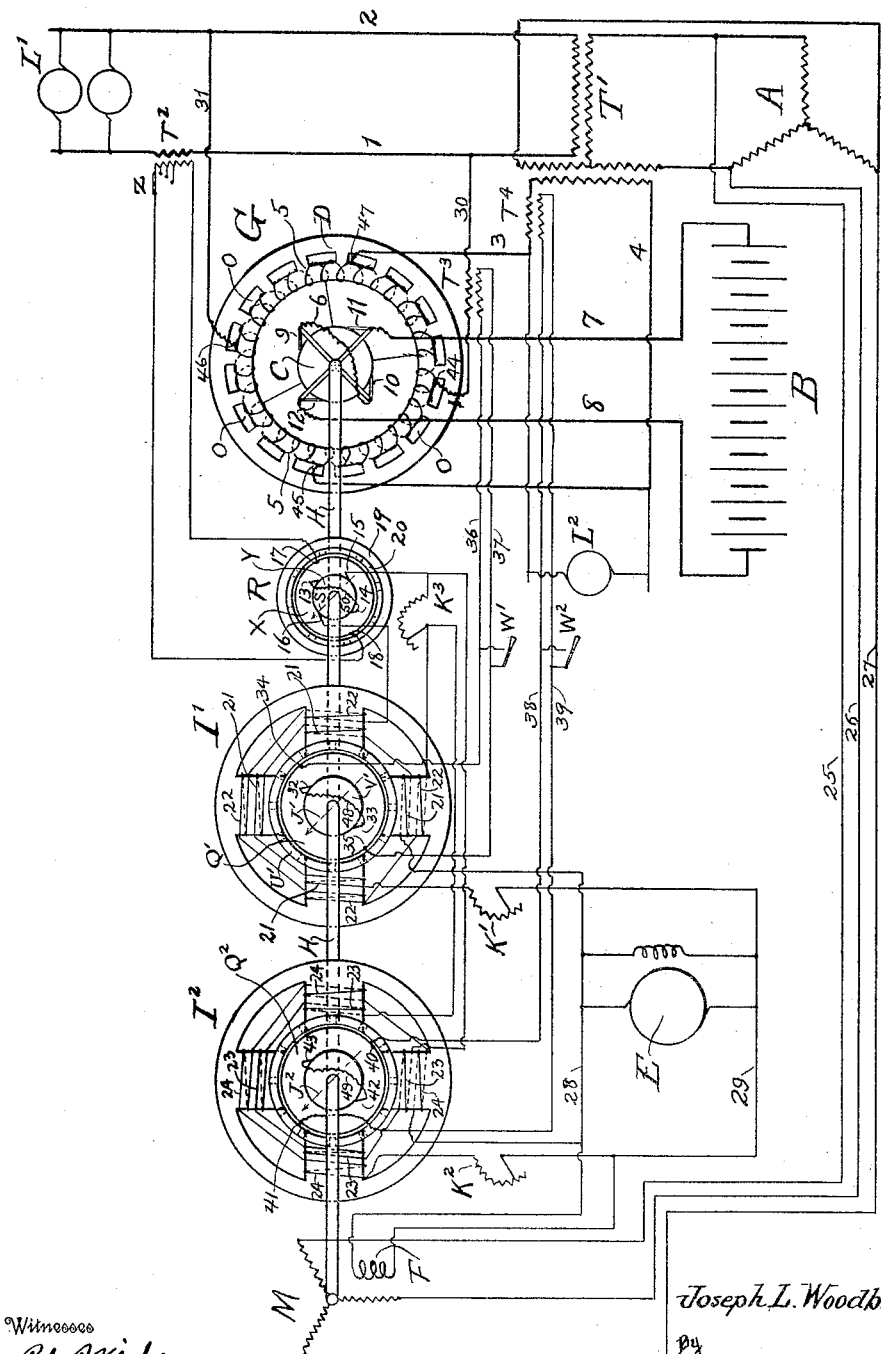
Witnesses
Robt R Ketchel
Frank E French
Inventor
Joseph L. Woodbridge
by
Augustus B Stoughton
Attorney

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

1,105,232.  Specification of Letters Patent.  Patented July 28, 1914.

Application filed April 20, 1909. Serial No. 490,988.

*To all whom it may concern:*

Be it known that I, JOSEPH LESTER WOODBRIDGE, a citizen of the United States, and a resident of Philadelphia, in the county of Philadelphia and State of Pennsylvania, have invented a certain new and useful System of Electrical Distribution, of which the following is a specification.

My invention relates to systems of distribution in which a source of alternating current is supplying a fluctuating load and more particularly where a source of polyphase currents is supplying a fluctuating single phase load, and in which a storage battery is employed for controlling the fluctuations of load on the source.

The objects of my invention are to provide simple and efficient means for causing the storage battery to relieve the generating source of the load fluctuations and, if the source is polyphase and the load single phase, to provide a uniform distribution of the load over the several phases. One of the pieces of apparatus described herein for accomplishing the desired results is a constant current single phase alternator, which in itself is novel. These and other objects, as well as the general nature and characteristic features of the invention, will be more clearly understood by reference to the following description taken in connection with the accompanying drawing.

The view shown in the drawings is diagrammatic and illustrates one embodiment of the invention.

In the drawings A is a source of alternating current supplying the load $L^1$, $L^2$; B is a regulating battery and G is a transforming apparatus for transferring energy between the battery and the load circuits; R is a rectifying device for transforming alternating current from the load circuit into direct current for controlling the fields of the machines $I^1$, $I^2$.

$I^1$, $I^2$ are constant current alternators which deliver current to the primary windings of the transformers $T^3$, $T^4$, respectively, thereby controlling the current in the secondary windings of these transformers to effect the desired regulation between the battery and the circuit through the apparatus G.

A, represents a three phase alternating current generator connected in the well known manner to the primary terminals of the three-phase-two phase-transformer $T^1$, whose secondary terminals are connected to the conductors 1, 2, and 3, 4 of a two-phase circuit. Across the conductors 1, 2 of one phase is connected a fluctuating single phase load $L^1$. A constant load $L^2$ may be connected across the conductors 3—4 of the other phase, and the loads $L^1$ and $L^2$ may be unequal. Connected to conductors 3, 4, and also by means of conductors 30 and 31 to conductors 1, 2, is shown a rectifying device G, to the direct current terminals of which is connected the storage battery B. This rectifying device is similar to that described in Patent #880,705, issued to me under date of March 3rd, 1908. It consists of an annular magnetic circuit D having openings O dividing it into an outer and an inner rim. A winding 5 is wound on the inner rim and connected in the usual manner to a commutator C, only a few of the connections from the winding to the commutator being shown in order to simplify the drawing. It will be understood, however, that this apparatus may be constructed like an ordinary direct current armature with its commutator, with the addition of a magnetic return circuit corresponding with the outer rim above referred to, which is fixed in position relatively to that portion of the magnetic circuit embraced by the winding. As here shown the magnetic circuit and the winding and commutator are fixed in position while the direct current brushes are revolved. It will be understood, however, that this arrangement may be inverted and the brushes may be stationary while the structure including the entire magnetic circuit, the winding and commutator may revolve. Two pairs of direct current brushes are shown, one pair 9, 10, being short-circuited by a low resistance conductor 6, while the other pair 11, 12, is connected to the terminals of the battery B. It will be understood that these latter connections are made by means of collector rings on the shaft H in the usual manner, these collector rings being omitted in order to simplify the drawing. These two sets of brushes bear upon the commutator at points displaced 90° from each other and are mounted on a shaft H which is revolved by a synchronous motor M connected to the source A by conductors 25, 26, and 27. The field of the synchronous motor is shown at F.

The alternating current terminals of the winding 5, are located at points 44, 45, 46, and 47, spaced 90° apart, these points being connected to the two-phase circuit as noted above. Two transformers $T^3$, $T^4$, are shown, one in each phase, the secondary winding of $T^3$ being connected in series with conductor 30, and the secondary winding of $T^4$ being connected in series with conductor 3. The primary windings of these two transformers are connected respectively to the machines $I^1$ and $I^2$. These two machines $I^1$ and $I^2$ are so designed that they will transmit through the primary windings of $T^3$ and $T^4$, respectively, alternating currents which may be held constant at any predetermined value or may be caused to fluctuate with fluctuations of load on the circuit 1, 2, as will be described herein below. The effect of these currents in the primary windings of transformers $T^3$ and $T^4$ will be to determine the transfer of energy between the source A and the battery through the rectifying apparatus G, as well as the distribution of this energy between the circuits 1, 2, and 3, 4. For any tendency to a flow of current through the secondaries of the transformers $T^3$ and $T^4$ other than that corresponding to the current in the primaries, these transformers will act as choke coils opposing said flow. Assuming first that the load at $L^1$ is constant, if the current flow derived from $I^1$ and $I^2$ in the primaries of transformers $T^3$ and $T^4$ be maintained constant, the transfer of energy from the source A to the battery will remain constant. If the load at $L^1$ should increase and the current in the primary of transformer $T^3$ should be made to decrease at the same time by a corresponding amount the transfer of energy from phase corresponding to the conductors 1, 2, to the rectifying device G may be reduced by an amount equal to the increase of load at $L^1$ and the total transfer of energy from transformer $T^1$ to the circuit 1, 2, may be held constant. This result is accomplished by means of the rectifier R, as will be explained below.

The machines $I^1$ and $I^2$ are identical except as to the location of the alternating current taps to the armature winding. The machine $I^1$ will therefore now be described. It consists of a field frame designed in the usual manner with four internally projecting poles and a bi-polar wound armature on the shaft H and is therefore driven by the motor M in synchronism with the source A. The armature is provided with single phase alternating current taps at points 34 and 35, which are connected to the primary winding of transformer $T^3$ by means of conductors 36 and 37. It will be understood that these connections are made by means of the usual collector rings on the shaft, these rings being omitted from the drawing for simplicity. A field winding 21 is shown on the poles of this machine connected across the circuit 28, 29, which is supplied with direct current by the exciter E. The winding 21 is so designed that the current transmitted through it from the circuit 28, 29, will produce a bi-polar field in the direction of the arrow $J^1$. The brushes 32 and 33 bear upon the commutator at points of maximum potential due to the field $J^1$ and these brushes are short-circuited by conductor 48. The flow of current through conductor 48 will produce a secondary field at right angles to $J^1$ and this field will produce the voltage necessary to transmit single phase current by way of conductors 36, 37, through the primary winding of transformer $T^3$. This flow of current in the armature winding of the machine $I^1$ will produce a single phase magneto motive force in that armature, which may be divided into two components rotating about the armature in opposite directions. The synchronous rotation of the armature will hold one of these components stationary in space and the value of the single phase current output from the points 34, 35, will be such that this stationary component of the magneto motive force will be sufficient nearly to counter balance that of the field winding 21, leaving a residuum just sufficient to produce the flow of current across the brushes 32 and 33 necessary to maintain the required strength of secondary field above referred to. Owing to the low resistance of conductor 48 this residuum will be very small and the flow of single phase current from the taps 34 and 35 will be practically proportional to the excitation produced by the field winding 21, and so long as this excitation is constant the output of single phase current from the points 34 and 35 to the primary winding of transformer $T^3$ will be constant. The second component of the single phase magneto motive force will by reason of the rotation of the armature be revolved in space at a speed double that of synchronism. In order to neutralize the effect of this component a conducting "squirrel cage" structure $U^1$ is shown surrounding the armature in close proximity to its periphery. The method of constructing this squirrel cage is well known in the art and need not be further described here. The currents induced in this squirrel cage as a result of the second component of the single phase magneto motive force will be such as to practically neutralize this component leaving merely the small residuum necessary to produce these induced currents. The machine $I^1$ is therefore a dynamo designed to give a constant current single phase output or broadly a single phase output proportional to its direct current field excitation.

The machine $I^2$ as mentioned above, is identical with $I^1$, except that the single phase taps 40, 41 are displaced 90° from the position of the taps 34, 35, in machine $I^1$. The single phase output from the machine $I^2$ will therefore be displaced in phase 90° from the output of the machine $I^1$. On the machine $I^1$ is shown a second field winding 22 and on machine $I^2$ is shown a second field winding 23. These two field windings are connected in series with each other across the brushes 15, 16, of the single phase rectifier R. This rectifier is similar to that described in my Patent No. 941,599, issued November 30th, 1909. It consists of a stationary magnetic circuit 19, provided with a conducting squirrel cage 20, within which is rotated an armature X provided with a commutator Y upon which bear two sets of brushes 13, 14 and 15, 16, respectively. Brushes 13, 14, are short-circuited while brushes 15, 16, are connected to the field windings 22 and 23, as mentioned above. Single phase taps are taken from the armature at points 17 and 18 and are connected to the terminals of the secondary winding of transformer $T^2$ whose primary is connected into conductor 1, so as to carry the total demand of the load $L^1$. A multiple contact switch Z is shown for adjusting the number of turns of the secondary winding of transformer $T^2$, which may be in circuit at any time, thereby adjusting the ratio of transformation. The armature X is mounted on the shaft H and rotated by the motor M in synchronism with the source A. The flow of single phase current from transformer $T^2$ through the armature X will produce a single phase alternating field in this armature and in the magnetic circuit surrounding it which may be divided into two components rotating in opposite directions. One of these will be held stationary in space by the rotation of the armature and is represented by an arrow S. It will produce a direct current electro-motive-force across the brushes 13, 14, and a flow of current through the conductor 50, thereby producing a secondary field at right angles to the field S. This will produce an electro-motive-force, across the brushes 15, 16, of sufficient amount to cause a flow of current from these brushes through the field windings 22 and 23, sufficient to nearly neutralize the magneto motive force due to the flow of single phase current from transformer $T^2$, leaving only a small residuum necessary to produce the field S and the flow of current in the conductor 49. The second component of the alternating field produced by the current from transformer $T^2$ will rotate in the direction of the armature rotation but at double frequency and will be practically neutralized by the squirrel cage structure 20 in the same manner as described in connection with the machine $I^1$. The flow of direct current from the machine R, through the field windings 22 and 23, will therefore be proportional to the single phase alternating current demanded by the load $L^1$. A resistance $K^3$ is shown connected in parallel with field winding 23 which may be used to adjust the proportion of current flowing through this field winding as compared with that in winding 22. The effect of current in the field winding 22 of the machine $I^1$ will therefore be proportional to the load $L^1$ and the winding 22 may be so connected as to oppose winding 21 which receives a constant current from the exciter E. An increase of load at $L^1$ will therefore reduce the total magneto motive force of the field windings on machine $I^1$ and correspondingly reduce the output of alternating current to the primary winding of transformer $T^3$, thereby reducing the amount of energy transmitted from conductors 1—2, through the machine G to the battery. The apparatus may be so proportioned that this reduction in the amount of energy transmitted to the battery will equal the increase of load at $L^1$ and therefore the total energy taken from the circuit 1—2 will remain constant. If the increase of load at $L^1$ is sufficiently great the transfer of energy from the circuit 1—2 to the battery may be reduced to zero or may even be reversed causing the battery to discharge through the rectifying apparatus G into the circuit 1—2 to assist in carrying a portion of the load $L^1$. If the resistance is all cut out of rheostat $K^3$ so that the field winding 23 on machine $I^2$ is short-circuited, variations of load at $L^1$ will not affect the alternating current output of machine $I^2$, and the amount of energy transmitted to the battery by way of conductors 3—4, will remain constant. Under these conditions the total load on the source will remain constant regardless of fluctuations of load at $L^1$.

By the proper adjustment of the rheostats $K^1$ and $K^2$ the alternating current outputs of the two machines $I^1$ and $I^2$ may be made equal when there is no load at $L^1$. This would produce an equal distribution of load between the two phases of the two-phase circuit 1—2 and 3—4, and will therefore, equalize the loads on the three-phases of the source A. This adjustment having once been made, will remain regardless of fluctuations of load at $L^1$. It may, however, be desirable to permit the source A to take a certain proportion of the load fluctuations while still dividing these fluctuations equally between the different phases. This could be accomplished by a suitable adjustment of the switch Z and of the rheostat $K^3$. By cutting in additional turns of the secondary winding of the transformer $T^2$ by means of switch Z, the flow of alternating current into the rectifier R for a given load at $L^1$ may be reduced. This will reduce the effect of the field winding 22 and the variations of current from the machine I¹ through the primary winding of the transformer T³, by their effect on the transfer of energy between the circuit 1—2 and the battery, will only partially compensate for the fluctuations of load at L¹, and a portion of these fluctuations will fall on the transformer T¹. By cutting in a part of the resistance of the rheostat K³, the effect of load fluctuations at L¹ will be felt in the field winding 23 of the machine I². This winding may be so connected as to assist winding 24 which is supplied with constant current from the exciter E, so that an increase of load at L¹ will cause an increase of current in the primary winding of transformer T⁴ and therefore an increase of load on the other phase of the transformer T¹. If this latter increase of load is made, by a suitable adjustment of the rheostat K³, equal to the increase of load falling upon the transformer T¹ from the circuit 1—2, then the fluctuations of load will be equally divided between the two-phases of the two-phase circuit and will therefore be equally distributed over the three phases of the source A.

It will be understood that the phase relations of the currents transmitted by the machines I¹ and I² through the primary windings of transformers T³ and T⁴ may be adjusted in any one of several different ways, as for example, by a suitable location of the taps 34, 35, 40 and 41, or by a proper adjustment of the armatures Q¹ and Q² on the shaft H, or by a proper adjustment of the field frames of these two machines. Ordinarily these adjustments would be made so as to bring the current transmitted through the primary windings of transformers T³ and T⁴ into phase with the potential across conductors 1, 2, and 3, 4, respectively. Circumstances might arise in which it would be desirable that these currents should be more or less out of phase, as for example, to compensate for a wattless component of the load L¹, and such adjustment could readily be effected.

The rectifying apparatus G is not dependent upon exciting current from the alternating current circuit to maintain the required rotating magnetic field. This field is produced by a flow of current through the winding 5, the brushes 9 and 10, and the conductor 6, in the following manner: A small flow of current from the battery through the brushes 11 and 12 and the winding 5 will produce a small magnetic flux in a direction corresponding with the line of contact of brushes 11 and 12, which will revolve with these brushes. This will produce a small electro-motive-force between the brushes 9 and 10 and a flow of current through conductor 6. On account of the low resistance of this latter conductor a small electro-motive-force will produce a considerable flow of current and the effect of this current in the winding 5 will be to produce a second field at right angles to the first and of considerable magnitude, sufficient in fact to produce a counter electro-motive-force across the brushes 11 and 12 nearly equal to the potential applied to these brushes by the battery. The excess of battery potential will be just sufficient to permit the small flow of current through the winding 5 by way of brushes 11 and 12 above mentioned. It will be seen therefore that the potential induced in the winding 5 by the second field above referred to will be dependent upon the potential maintained by the battery across the brushes 11 and 12. This characteristic is important since the self induction in the transformers T³ and T⁴ would prevent a flow of magnetizing current through the winding 5 from the alternating current circuit, and if the counter electro-motive-force at the brushes 11 and 12 were not maintained by means of the other pair of short-circuited brushes as above described the winding 5 being of low resistance would constitute a short-circuit for the battery and the apparatus would be inoperative. Whenever alternating currents are taken out or sent into the winding 5 by means of conductors 3—4 and 30—31 the effect of these will be to cause a corresponding flow of current out of or into the battery by way of the brushes 11 and 12; these currents being so combined in the winding 5 that the resultant magneto motive-force will be equivalent to that of the small flow of current first mentioned from the battery by way of brushes 11 and 12. Briefly the combination shown comprises a polyphase source supplying a load which is unequally distributed over the several phases, and provides means for taking energy from a lightly loaded phase, storing said energy in a storage battery during a portion of each cycle, and delivering said energy to a more heavily loaded phase during the remainder of the cycle, thus equalizing the load on the several phases, and at the same time it may compensate for fluctuations of load on one or more of the phases.

Switches W¹ and W² are shown connected respectively across the conductors 36—37 and 38—39. If these switches are closed the primaries of transformers T³ and T⁴ are short-circuited, and these transformers will have no effect in controlling the transmission of energy between the circuit 1—2 and the rectifying apparatus G.

The machines I¹ and I², as noted above, may be used as constant current single phase alternators, or may be used to give a single phase output whose current value is dependent upon the field excitation of the machine and practically independent of any resistance or counter electro-motive-force in the external circuit. It will be understood that a machine of this kind may be applied to many uses other than that shown and described herein, and the control of its field excitation and therefore of its current output may be effected in any of the many ways well known in the art. I have therefore directed certain claims to this machine taken by itself and have embodied said claims in a divisional application, Serial No. 562,355 filed May 20, 1910.

What I claim is:

1. In combination, a poly-phase source, a load unequally distributed between the phases, a storage battery, and means for taking energy from a lightly loaded phase, storing said energy in the battery during a portion of each cycle and delivering said energy to a more heavily loaded phase during the remainder of each cycle.

2. In combination a poly-phase source, a single phase work circuit supplying a fluctuating load connected to one phase of the source, a storage battery, rectifying apparatus connected between the battery and all phases of the source, and adapted to receive a constant amount of energy from the phases other than the working phase and to transmit energy to or from the working phase varying with the fluctuations of load thereon, and to transmit the surplus to or from the battery to maintain constant load equally distributed on all phases of the source.

3. An alternating current source and its circuit, a fluctuating load supplied thereby, a storage battery a magnetic circuit all parts of which are relatively fixed, a winding on said magnetic circuit, a commutator connected to said winding, two sets of relatively displaced brushes bearing upon said commutator whereof one set is connected to the storage battery while the brushes of the other set are interconnected by a separate conducting circuit, means for producing relative rotation of brushes and commutator in synchronism with the source, appropriate connections from the winding to the alternating current circuit, a plurality of coils in inductive relation, whereof some are connected in series between the winding and the circuit, and means for transmitting through the others alternating currents of predetermined value in synchronism with the source.

4. An alternating current source and its circuit, a fluctuating load supplied thereby, a storage battery, a magnetic circuit all parts of which are relatively fixed, a winding on said magnetic circuit, a commutator connected to said winding, two sets of relatively displaced brushes bearing upon said commutator whereof one set is connected to the storage battery while the brushes of the other set are interconnected by a separate conducting circuit, means for producing relative rotation of brushes and commutator in synchronism with the source, appropriate connections from the winding to the alternating current circuit, a plurality of coils in inductive relation, whereof some are connected in series between the winding and the circuit, means for transmitting through the others alternating currents in synchronism with the source, and means independent of the load for controlling said currents.

5. An alternating current source, and its circuit, a fluctuating load supplied thereby, a storage battery a magnetic circuit all parts of which are relatively fixed, a winding on said magnetic circuit, a commutator connected to said winding, two sets of relatively displaced brushes bearing upon said commutator whereof one set is connected to the storage battery while the brushes of the other set are interconnected by a separate conducting circuit, means for producing relative rotation of brushes and commutator in synchronism with the source, appropriate connections from the winding to the alternating current circuit, a plurality of coils in inductive relation, whereof some are connected in series between the winding and the circuit, means for transmitting through the others alternating currents in synchronism with the source, and two means for controlling said currents whereof one is independent of the load and the other is responsive thereto.

6. A poly-phase alternating current source and its circuit, a fluctuating load supplied by one phase of said source, a storage battery, a magnetic circuit all parts of which are relatively fixed, a winding on said magnetic circuit, a commutator connected to said winding, two sets of relatively displaced brushes bearing upon said commutator whereof one set is connected to the storage battery, a separate conducting circuit interconnecting the brushes of the other set, means for producing relative rotation of brushes and commutator in synchronism with the source, appropriate connections from the winding to the several phases of the alternating current circuit, a plurality of current transformers, one for each phase, having their secondary coils connected in series between the said winding and the alternating current circuit, means for transmitting through their primary coils alternating currents in synchronism with the source, means independent of the fluctuating load for controlling said alternating currents, and means responsive to the fluctuating load for controlling the alternating current in the primary of the current transformer connected to the loaded phase.

7. In combination a polyphase alternating current circuit and its source, translating devices constituting an unbalanced load whereof that portion on one of the phases is fluctuating, a storage battery, means for transferring energy in either direction between the battery and the circuit, means responsive to the fluctuating load and adapted to control the transfer of energy between the battery and the phase carrying said fluctuating load, and other means for controlling the transfer of energy between the battery and the other phase or phases.

8. In combination, a polyphase alternating current circuit and its source, translating devices constituting a load connected to the circuit and unbalanced in respect to the phases thereof, a storage battery, means for transferring energy between the battery and the circuit, and means for controlling the distribution of said energy between the battery and the several phases.

9. In combination, a polyphase alternating current circuit and its source, translating devices constituting a fluctuating load connected to one phase of the circuit, storage apparatus, means for transmitting energy in either direction between said apparatus and the circuit, and means responsive to the fluctuating load and adapted to control the transmission of energy between said apparatus and the several phases of the circuit whereby a portion of each load fluctuation is placed upon the battery and the balance is divided with substantial equality between the phases.

10. In combination a polyphase alternating current circuit and its source, translating devices constituting a load unbalanced between the phases, transforming apparatus interconnected between the phases and adapted to transfer energy between them, and means for introducing alternating E. M. F. between the transforming apparatus and the circuit, said E. M. F. controlled by current in said circuit and adapted to control said transfer of energy between the phases.

11. In combination, a polyphase alternating current circuit and its source, translating devices constituting a fluctuating load connected to one phase of the circuit, storage apparatus, converting apparatus connected between the storage apparatus and the circuit, means responsive to fluctuations of load on said one phase and adapted to cause energy to be transmitted through the converting apparatus between said phase and the storage apparatus, and other means for causing energy to be transmitted between the other phase or phases and the storage apparatus.

In testimony whereof I have hereunto signed my name.

JOSEPH LESTER WOODBRIDGE.

Witnesses:
CLIFFORD K. CASSEL,
FRANK E. FRENCH.